G. E. TAYLOR.
Sheet-Iron Blank.
No. 168,063. Patented Sept. 21, 1875.
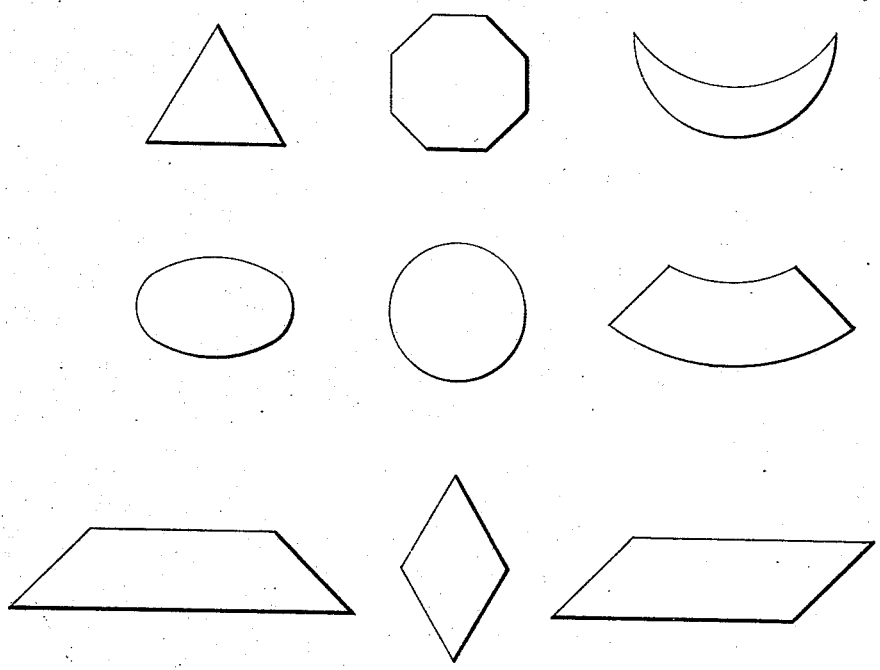
Witnesses,
Harry Smith
Hubert Howson
George E. Taylor
by his attorneys,
Howson and Son

UNITED STATES PATENT OFFICE.

GEORGE E. TAYLOR, OF PHILADELPHIA, PENNSYLVANIA.

IMPROVEMENT IN SHEET-IRON BLANKS.

Specification forming part of Letters Patent No. 168,063, dated September 21, 1875; application filed May 25, 1875.

*To all whom it may concern:*

Be it known that I, GEORGE E. TAYLOR, of Philadelphia, Pennsylvania, have invented certain Improvements in Tinned Plates, and in the manufacture of the same, of which the following is a specification:

The object of my invention is economy in the manufacture of articles of tin-ware, and in the consumption of tin or tinning alloy used in the preparation of tinned plates.

Tinned plates, as at present sold in the market, are of oblong or square form, so that when pieces of the desired shape for the manufacture of useful articles of tin-ware are cut or punched from them there must necessarily be much waste, not only of sheet-iron in the form of scraps, but of the tin or alloy with which such scraps are coated.

I avoid this waste by first cutting or punching from sheet-iron pieces of the shape desired for conversion into parts of articles of tin-ware, and then tinning the pieces preparatory to such conversion.

In the accompanying drawing are shown a few instances of pieces of sheet-iron of different forms of plates to meet the requirements of different articles of tin-ware, the plates being subjected to the tinning-bath after being thus cut to shape, and before they are used in manufacturing tin articles.

Economy in the consumption of tin or tinning alloy must necessarily be the result of this plan of first shaping, and subsequently tinning, sheet-iron pieces.

The pieces thus tinned, after they are cut to shape, possess another prominent advantage, which distinguishes them from similarly-shaped plates cut from ordinary tinned sheets. In the latter the iron is necessarily exposed at the edges wherever the sheets have been severed, whereas this exposure is prevented in carrying out my invention, for all the edges of every plate are coated with tin, and thus facilitate the making of perfectly-soldered joints.

The improved tinned plates, of a proper size and shape for conversion into standard articles of tin-ware without shearing, may be sold to manufacturers, whose operations will be materially facilitated.

I claim as my invention—

As a new article of manufacture and commerce, plates of sheet-iron tinned on both sides and at all the edges, and shaped for conversion into, or forming parts of, articles of tin-ware without being sheared prior to such conversion, all as set forth.

In testimony whereof I have signed my name to this specification in the presence of two subscribing witnesses.

GEO. E. TAYLOR.

Witnesses:
HUBERT HOWSON,
HARRY SMITH.